United States Patent
Zielnicki

(10) Patent No.: US 8,234,768 B2
(45) Date of Patent: Aug. 7, 2012

(54) METHOD OF FORMING AN INFORMATION HANDLING SYSTEM ENCLOSURE

(75) Inventor: Steven Zielnicki, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 12/543,021

(22) Filed: Aug. 18, 2009

(65) Prior Publication Data

US 2011/0043084 A1      Feb. 24, 2011

(51) Int. Cl.
   *B21D 39/03*    (2006.01)
(52) U.S. Cl. ............. 29/428; 72/361; 72/377; 72/379.2; 72/379.6
(58) Field of Classification Search ............ 29/428; 72/361, 377, 379.2, 379.6
   See application file for complete search history.

(56) References Cited

U.S. PATENT DOCUMENTS

| | | | |
|---|---|---|---|
| 4,058,998 A * | 11/1977 | Franek et al. ............. | 72/84 |
| 4,155,798 A | 5/1979 | Becker | |
| 4,512,172 A * | 4/1985 | Abbott et al. ............. | 72/68 |
| 4,606,207 A * | 8/1986 | Slade ..................... | 72/96 |
| 4,760,725 A * | 8/1988 | Halasz .................... | 72/84 |
| 4,781,047 A * | 11/1988 | Bressan et al. ............. | 72/84 |
| 4,870,847 A * | 10/1989 | Kitt ...................... | 72/84 |
| 5,349,836 A * | 9/1994 | Lee, Jr. .................. | 72/84 |
| 5,596,897 A * | 1/1997 | Payne et al. ............... | 72/84 |
| 6,347,454 B1 | 2/2002 | Jurica et al. | |
| 7,697,281 B2 * | 4/2010 | Dabov et al. ............. | 361/679.55 |
| 2002/0002891 A1 | 1/2002 | Arnold | |
| 2009/0040703 A1* | 2/2009 | Gotham et al. ............ | 361/681 |

FOREIGN PATENT DOCUMENTS

GB     191226683 A * 0/1913

* cited by examiner

*Primary Examiner* — Carl Arbes
(74) *Attorney, Agent, or Firm* — Hamilton & Terrile, LLP; Robert W. Holland

(57) ABSTRACT

An information handling system enclosure is formed from a metal panel having a thickness, such as approximately 1 mm, by stamping a raised edge from the panel so that the height of the edge appears as a thickness of the panel, such as 2.5 mm. The raised edge is stamped to have a raised edge of slightly greater than the final edge height and then punched into a corner tool to provide the raised edge with a desired height. Punching into the corner tool forms the edge along the outer circumference of the panel to have a substantially square appearance.

14 Claims, 3 Drawing Sheets

METHOD OF FORMING AN INFORMATION HANDLING SYSTEM ENCLOSURE

BACKGROUND OF THE INVENTION

1. Field of the Invention

The present invention relates in general to the field of information handling system enclosure manufacture, and more particularly to an information handling system enclosure and process for manufacture of cosmetic formed corners.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The availability of powerful processing components with reduced size and power consumption has spurred increased interest by end users in portable information handling systems. A portable information handling system integrates I/O devices and a power source within a portable enclosure so that end users can use the information handling system free from any physical connections to fixed locations. For example, a typical portable information handling system enclosure has a chassis with a hinged lid. The chassis integrates a keyboard for accepting end user inputs and a battery for powering processing components that process information. The lid integrates a liquid crystal display that presents information to an end user. In addition to the integrated keyboard and display, portable information handling systems also typically integrate wireless networking capabilities that allow the system to communicate through wireless networks without a physical network cable. The convenience provided by portability combined with near-desktop performance has resulted in end users converting from fixed desktop systems to instead use portable information handling system for all information processing needs.

In order to provide enhanced portability, information handling system manufacturers strive to integrate as much processing capability as possible in as small of an enclosure as possible. In addition to reduced size, manufacturers also seek to reduce system weight so that portable information handling systems are less awkward to hold and use. As a result, portable information handling systems have come to market with very thin profiles and light weight. Forming an enclosure for such small information handling systems presents a challenge, especially with light weight metals such as aluminum and magnesium. One example of a challenge presented by light weight metals is that if the enclosure does not have a well-formed base, aluminum will not anodize with a consistent finish. Another example is that thin metal enclosures give an end user an impression that the enclosure is flimsy. Although a thickness of 1 mm of aluminum provides substantial support for enclosing processing components, a thickness of 2.5 mm tends to provide end users with greater security regarding the stoutness of the enclosure. When forming aluminum thicknesses of less than 1 mm, standard forming techniques will sometimes create outside radii of curved surfaces that are greater than the material thickness. A mixture of stamped and forged parts might provide an enclosure with sufficient strength around corners while keeping desired cosmetic qualities, however the metal tends to have inconsistent colors after anodizing.

SUMMARY OF THE INVENTION

Therefore a need has arisen for a system and method which provide a strong but cosmetically pleasing information handling system enclosure manufactured from thin metal.

In accordance with the present invention, a system and method are provided which substantially reduce the disadvantages and problems associated with previous methods and systems for manufacture of an information handling system enclosure. A metal panel is stamped to form a raised edge and then the raised edge is punched into a corner tool to form a near sharp corner so that the metal panel appears to have a thickness of the height of the raised edge.

More specifically, an information handling system enclosure is stamped from a metal panel of a generally uniform thickness, such as aluminum or magnesium. The stamping forms a raised edge of an initial height around at least a portion of the circumference of the metal panel. The raised edge is then punched into a corner tool so that the rounded corner of the raised edge compresses into a near sharp corner that gives the raised edge an appearance of the thickness of the metal panel. A rounded edge may be formed of the raised edge by pressing the raised edge against a cam slide. The stamping and punching process provides an enclosure product that has a consistent tolerance for mass production with a consistent surface finish that, for example, supports anodizing of an aluminum metal panel.

The present invention provides a number of important technical advantages. One example of an important technical advantage is that an information handling system enclosure is manufactured with adequate strength and a cosmetically-pleasing appearance. The enclosure has a consistent thickness that allows a consistent finish, such as by anodizing aluminum. Edges of the enclosure are formed to have an appearance of greater thickness for a perception of a thick casing while having a reduced weight. Sharp corners help to enhance the thick appearance and are formed with relatively thin enclosure material without tears, wrinkles or ridges.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A sharply formed raised edge along the circumference of an information handling system enclosure provides an appearance that the enclosure has a thickness of greater than the thickness for the metal panel used to form the enclosure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
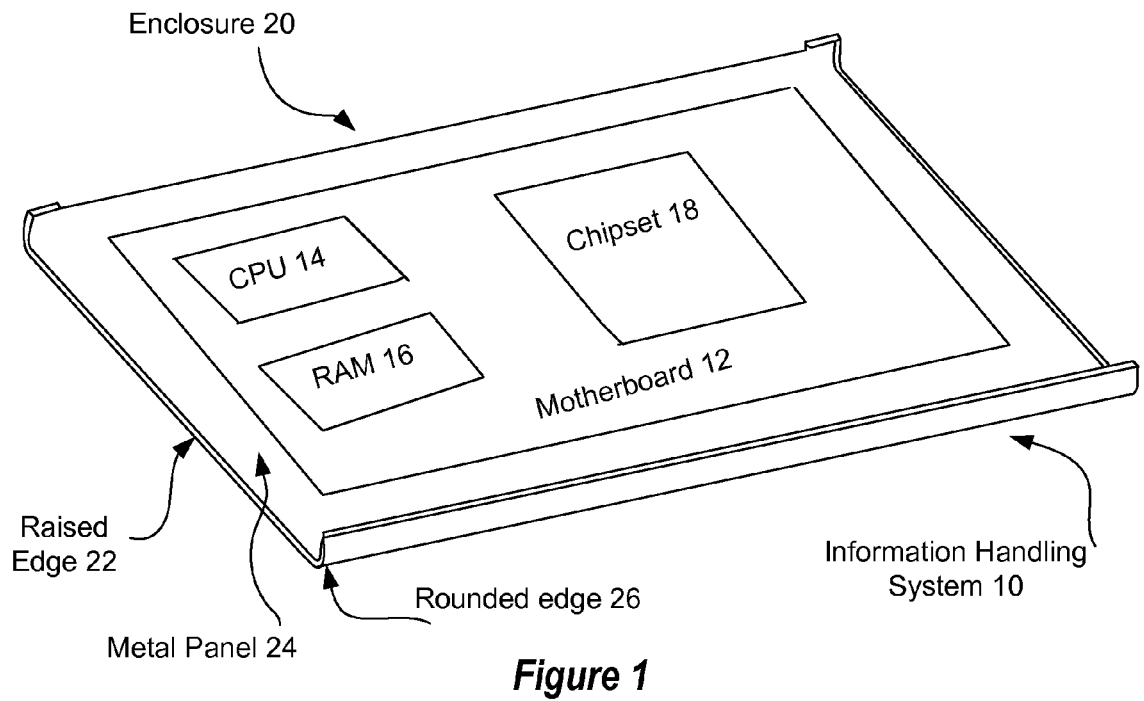
FIG. 1 depicts an example information handling system built on an enclosure having a raised edge manufactured by a process according to the present disclosure.

Referring now to FIG. 1, an example is depicted of information handling system 10 built on an enclosure 20 having a raised edge 22 manufactured by a process according to the present disclosure. Information handling system 10 encloses processing components that cooperate to process information, such as a motherboard 12 that supports communication between a CPU 14, RAM 16 and a chipset 18. Enclosure 20 is manufactured from a flat metal panel 24 of a consistent thickness, such as 1 mm. A raised edge 22 is formed around the outer circumference of metal panel 24, such as an edge of 2.5 mm. Raised edge 22 has a sharp corner formed by a stamping process described herein so that, when viewing information handling system 10, the thickness of metal panel 24 appears to be the height of raised edge 22, thus providing an appearance of a robust enclosure. A rounded edge formed by bending metal panel 24 about a cam also maintains an appearance of thickness of raised edge 22 by bending raised edge 22 ninety degrees to a perpendicular or other alignment. In one embodiment, enclosure 20 is manufactured from aluminum and anodized to a uniform appearance that is typically not available from a forged aluminum part. In alternative embodiments, alternative metals are used for the panel, such as magnesium, stainless steel, copper or other types of materials. Although the example embodiment has a metal panel of 1 mm thickness and a raised edge of 2.5 mm height, in alternative embodiments, other metal thicknesses and raised edge heights might be used.

Figure 2:
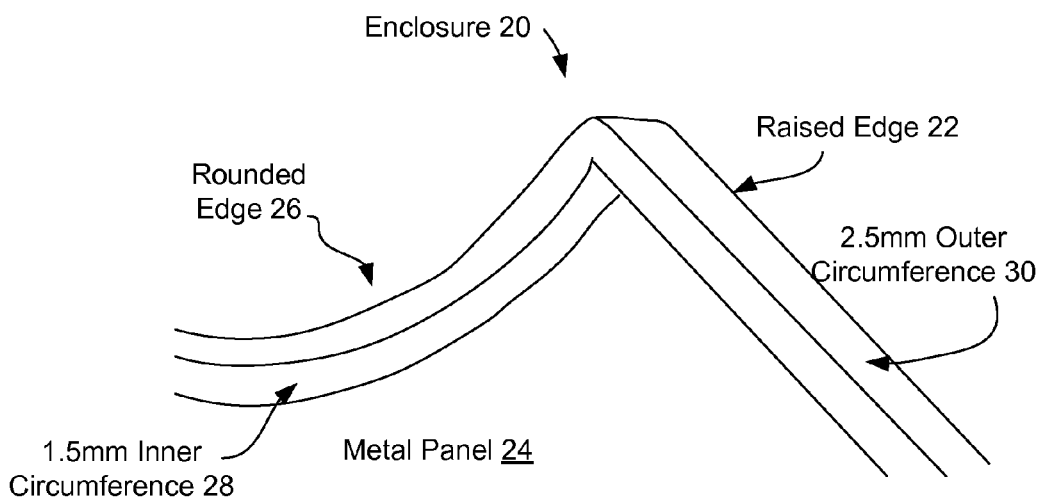
FIG. 2 depicts a close up view of an enclosure having a raised and rounded edge manufactured by a process according to the present disclosure.

Referring now to FIG. 2, a close up view depicts an enclosure 20 having a raised edge 22 and rounded edge 26 manufactured by a process according to the present disclosure. Metal panel 24 having a thickness of 1 mm has raised edge 22 stamped with an inner circumference 28 and outer circumference 30. The raised edge 22 along outer circumference 30 has a greater height than the raised edge along inner circumference 28, such as a height of 2.5 mm along outer circumference 30 versus 1.5 mm for inner circumference 28. The height of raised edge 22 at outer circumference 30 appears as a thickness of metal panel 24 while inner circumference 28 is hidden within enclosure 20. Rounded edge 26 is formed by bending raised edge 22 around a cam to maintain the appearance of a metal panel of uniform thickness equal to the height of raised edge 22.

Figure 3:
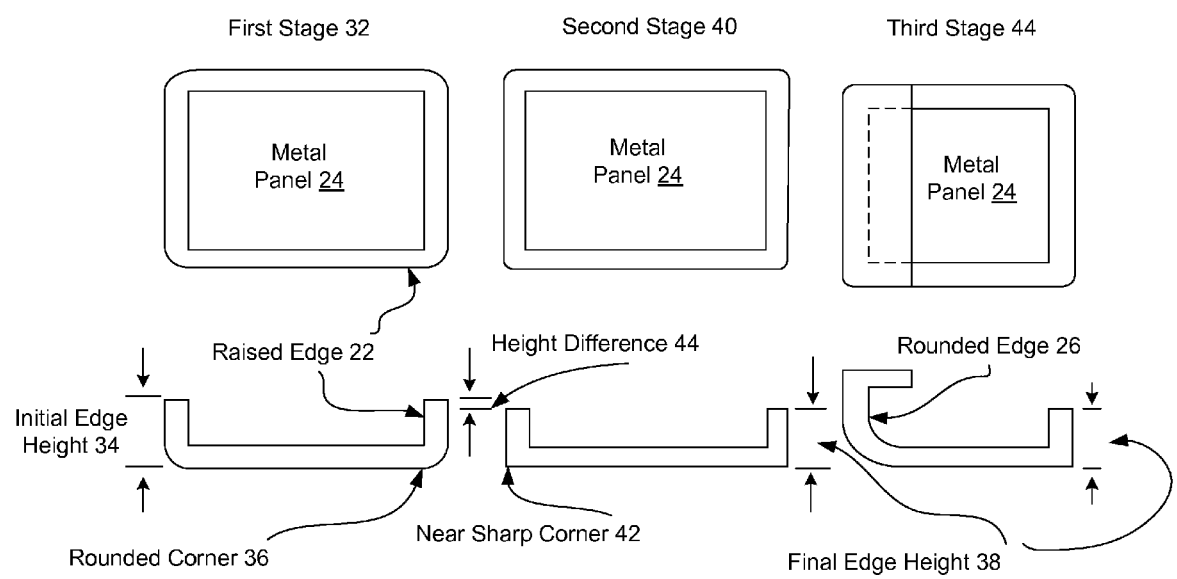
FIG. 3 depicts manufacture of a raised edge by a process according to the present invention.

Referring now to FIG. 3, manufacture of a raised edge 22 by a process according to the present invention is depicted. At a first stage 32, metal panel 24 is stamped so that raised edge 22 has an initial edge height 34 that is drawn slightly higher than a final raised edge height 38 desired for the enclosure. Stamping forms raised edge 22 with a round corner 36 that is commonly associated with bent metal. At a second stage 40, metal panel 24 is punched into a corner tool to form a near sharp corner 42 that provides an appearance from a side outer circumference view of thickness of metal panel 24. A height difference 44 results from the punch operation forcing metal into round corner 36 to form near sharp corner 42. The sharpness of corner 42 depends upon the shape of the tool used to punch metal panel 24 and the force with which the tool is applied. In third stage 44, rounded edge 26 is formed by bending metal panel 24 with a cam tool. Raised edge 22 remains perpendicular to the outer surface of information handling system enclosure 20 so that rounded edge 26 appears have resulted from bending a metal panel with a thickness equal to the final edge height 38 of raised edge 22.

Figure 4:
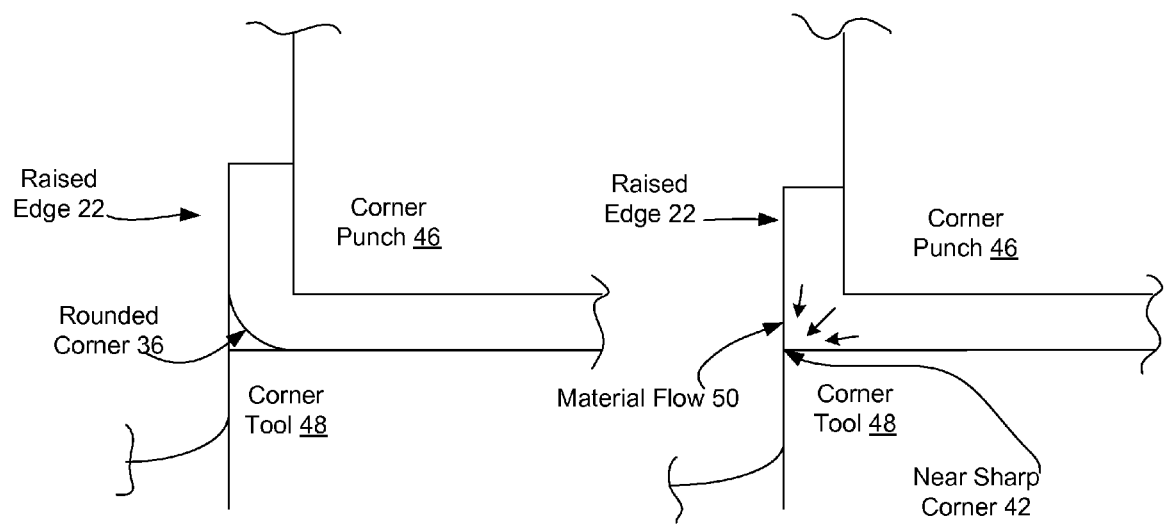
FIG. 4 depicts punching of a raised edge into a corner tool to manufacture an enclosure.

Referring now to FIG. 4, punching of a raised edge 22 into a corner tool 48 to manufacture an enclosure is depicted. Initially, after stamping, rounded corner 36 provides a gap between corner tool 48 and corner punch 46. At application of force by corner punch 46 to metal panel 24 and corner tool 48, force applied to metal panel 24 causes material flow 50 into the gap formed by rounded corner 36 to form near sharp corner 42. Material flow 50 reduces the height of raised edge 22 from an initial height to a lower final height. Near sharp corner 42 provides raised edge 22 with an appearance so that, when viewed from a side, raised edge 22 appears to be the thickness of metal panel 24.

Although the present invention has been described in detail, it should be understood that various changes, substitutions and alterations can be made hereto without departing from the spirit and scope of the invention as defined by the appended claims.

What is claimed is:

1. A method for forming an information handling system enclosure, the method comprising:
    stamping a flat metal panel to form a raised edge along the panel circumference, the edge drawn greater than a final edge height;
    punching the panel along the raised edge and into a corner tool to compress the raised edge to a final edge height and to form a corner along the panel circumference; and
    assembling the panel into an information handling system enclosure having the corner disposed at an outer circumference of the enclosure so that the raised edge presents as the thickness of the panel.

2. The method of claim 1 further comprising forming a rounded edge along a portion of the circumference by bending the panel to align the raised edge substantially perpendicular to the panel.

3. The method of claim 2 wherein forming a rounded edge comprises pressing the metal panel against a cam.

4. The method of claim 1 wherein the metal panel comprises aluminum.

5. The method of claim 4 further comprising anodizing the aluminum.

6. The method of claim 1 further comprising installing processing components into the enclosure.

7. The method of claim 6 further comprising processing information with the processing components.

8. An information handling system enclosure built by a process of:
- stamping a flat metal panel to form a raised edge along the panel circumference, the edge drawn greater than a final edge height; and
- punching the panel along the raised edge and into a corner tool to compress the raised edge to a final edge height and to form a corner along the panel circumference, the raised edge disposed at an outer surface of the enclosure to provide an appearance that the panel has a thickness of the raised edge.

9. The information handling system enclosure of claim 8 built by a process further comprising forming a rounded edge along a portion of the circumference by bending the panel to align the raised edge substantially perpendicular to the panel.

10. The information handling system enclosure of claim 9 wherein forming a rounded edge comprises pressing the metal panel against a cam.

11. The information handling system enclosure of claim 10 wherein the metal comprises aluminum.

12. The information handling system enclosure of claim 10 wherein the metal comprises anodized aluminum.

13. The information handling system enclosure of claim 10 wherein the metal comprises magnesium.

14. The information handling system enclosure further comprising plural processing components.

* * * * *